US005735314A

United States Patent [19]
Alaze et al.

[11] Patent Number: 5,735,314
[45] Date of Patent: Apr. 7, 1998

[54] HYDRAULIC ACCUMULATOR FOR A BRAKE SYSTEM

[75] Inventors: Norbert Alaze, Markgroeningen; Wolfgang Schuller, Sachsenheim, both of Germany

[73] Assignee: Robert Bosch GmbH, Stuttgart, Germany

[21] Appl. No.: 656,514

[22] Filed: May 31, 1996

[30] Foreign Application Priority Data

May 31, 1995 [DE] Germany ............. 195 19 832.8

[51] Int. Cl.$^6$ ............................................. F16L 55/04
[52] U.S. Cl. ................................................... 138/31
[58] Field of Search ..................... 138/30, 31; 303/87

[56] References Cited

U.S. PATENT DOCUMENTS

| | | |
|---|---|---|
| 2,695,037 | 11/1954 | McCuistion ............. 138/31 |
| 3,537,357 | 11/1970 | Packer ................. 138/31 X |
| 4,442,866 | 4/1984 | Loukonen .............. 138/31 |
| 5,070,983 | 12/1991 | Leigh-Monstevens et al. ..... 303/87 X |
| 5,161,864 | 11/1992 | Cardenas et al. ......... 303/87 |
| 5,244,262 | 9/1993 | Kehl et al. . |
| 5,460,438 | 10/1995 | Hellmann et al. ....... 303/87 X |

FOREIGN PATENT DOCUMENTS

| | | |
|---|---|---|
| 1183477 | of 0000 | United Kingdom . |
| WO9511824 | 5/1995 | WIPO . |

*Primary Examiner*—Paul C. Lewis
*Attorney, Agent, or Firm*—Edwin E. Greigg; Ronald E. Greigg

[57] ABSTRACT

The invention sets forth a hydraulic accumulator-damper which facilitates design and assembly of a brake system with a traction control for a motor vehicle. To this end, an end wall of a piston in a housing of the hydraulic accumulator is provided with a damping diaphragm. Between the damping diaphragm and the housing end wall, the damping diaphragm encloses a damping chamber into which a throttle bore discharges through the housing end wall.

18 Claims, 2 Drawing Sheets

HYDRAULIC ACCUMULATOR FOR A BRAKE SYSTEM

BACKGROUND OF THE INVENTION

The invention is based on a hydraulic accumulator for a brake system.

Hydraulic accumulators of this kind are used in hydraulic brake systems of motor vehicles which are equipped with an antilock system or a traction control system. They are required for temporarily receiving brake fluid from a wheel-mounted brake cylinder in order to be able to reduce the brake pressure in the brake cylinder in a sufficiently rapid manner. The flow of brake fluid emerging from the brake cylinder often exceeds the delivery capacity of a return pump.

Brake pressure modulation by means of an inlet valve and an outlet valve for each wheel-mounted brake cylinder, pulsating brake fluid delivery by a one-piston return pump, and a pressure limiting valve, which opens suddenly upon the attainment of an opening pressure and allows brake fluid to flow in the direction of a master cylinder and closes suddenly when the pressure falls below a closing pressure, are all causes of pressure fluctuations and pressure peaks, which place a great deal of strain on the brake system and create noise. German Patent Disclosure DE 43 36 464 A1 (U.S. Pat. No. 5,244,262) discloses the use of a hydraulic damper to smooth these pressure fluctuations and prevent pressure peaks.

OBJECT AND SUMMARY OF THE INVENTION

The hydraulic accumulator according to the invention has the advantage that a hydraulic damper can be integrated into it in a simple manner. An additional hydraulic damper, which requires at least one bore, a piston, and various small parts, is not necessary. In contrast to known hydraulic accumulators, only one additional damping diaphragm is required, which is mounted on an end face of a piston of the hydraulic accumulator. The expense and effort involved in production and assembly are reduced, which has pronounced cost advantages.

The damping diaphragm in the hydraulic accumulator is elastically deformed (compressed or expanded) and curved by pressure fluctuations in the brake fluid. In this manner, it absorbs energy and damps the pressure fluctuations. The damping diaphragm damps pressure fluctuations in the brake fluid additionally or exclusively by means of a gas cushion, which it keeps separate from the brake fluid and which is compressed and released as a result of pressure fluctuations in the brake fluid.

Preferably the damping diaphragm is embodied and disposed so that it can be deformed in both directions, and as a result, it damps both pressure increases and pressure decreases.

The invention will be better understood and further objects and advantages thereof will become more apparent from the ensuing detailed description of a preferred embodiment taken in conjunction with the drawings.

DETAILED DESCRIPTION OF THE PREFERRED EMBODIMENT

Figure 1:
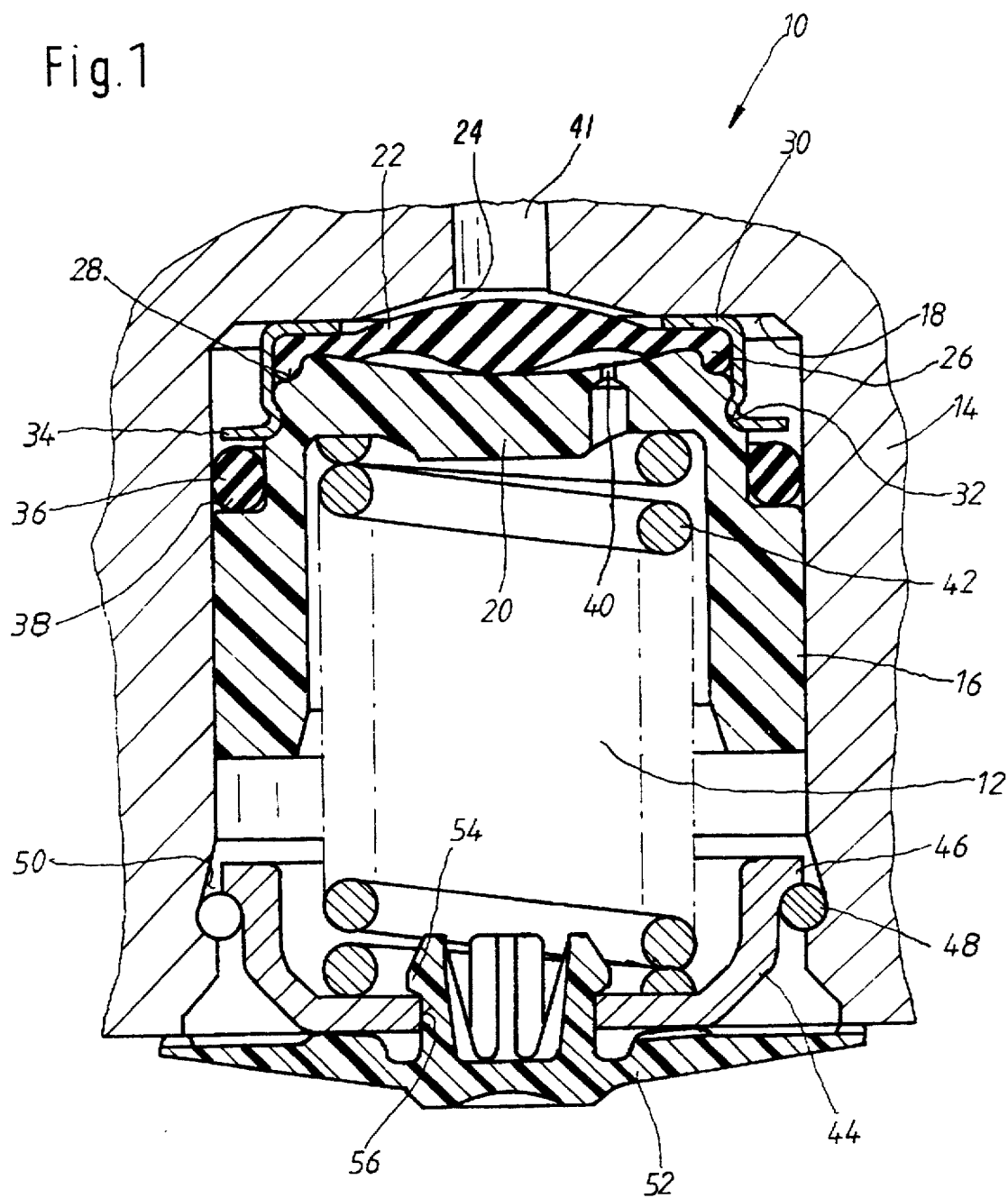
FIG. 1 shows a longitudinal section through a hydraulic accumulator according to the invention.

The accumulator 10 according to the invention, which is shown in FIG. 1, is accommodated in a blind bore 12 in a hydraulic block 14, of which only a region which contains the hydraulic accumulator 10 is shown in FIG. 1. A piston 16 made of plastic is disposed in the blind bore 12 so that it can move in the axial direction.

A damping diaphragm 22 is mounted on an end wall 20 of the piston 16, which wall is oriented toward a closed end 18 of the blind bore 12. This diaphragm is circular, and its diameter is somewhat smaller than the piston diameter. The damping diaphragm 22 comprises an elastomer, for example an EPDM mixture with a high capacity for stretching and with a Shore hardness of 70 to 80 Shore A. In its central region, the damping diaphragm 22 is shaped somewhat like a lens. Between its back side and the end wall of the piston 20, the damping diaphragm 22 encloses an annular damping chamber 24; at its center, the damping diaphragm 22 rests on the piston end wall 20. A throttle bore 40 passes through the piston end wall 20 and discharges into the damping chamber 24.

On its circumference, the damping diaphragm 22 has an annular bead 26 which is of one piece with the diaphragm and protrudes in the direction of the piston 16 and which rests in a complementarily shaped annular recess 28 which the piston 16 has on its end face 20. A retaining ring 30, which is manufactured as a deep-drawn sheet metal part, overlaps the circumference of the damping diaphragm 22 and holds its annular bead 26 in the annular recess 28 of the piston 16 so that the damping diaphragm 22 is fixed to the end wall 20 of the piston 16. The retaining ring 30 is attached to the piston 16 by being crimped into a circumference groove 32 of the piston 16.

On its end remote from the damping diaphragm 22, the retaining ring 30 has a flange 34 which is of one piece with the retaining ring and protrudes radially outward. This flange holds an O-ring 36, which seals the piston 16 in relation to the blind bore 12, in its position on an annular step 38 embodied on the outer circumference of the piston 16, at which step the piston 16 widens away from the damping diaphragm 22 out to its nominal diameter.

A helical compression spring 42 disposed inside the piston is supported on an inner side of a retaining cap 44, which is inserted into a mouth of the blind bore 12, and presses the piston 16 toward the closed end 18 of the blind bore 12. The hydraulic accumulator 10 according to the invention communicates with a brake line, which is not shown in FIG. 1, by means of the conduit 40 which leads away from the closed end 18 of the blind bore 12.

With an outer flange 46, the retaining cap 44 engages a snap ring 48 from behind, the snap ring being inserted into a groove 50 of the blind bore 12. A cover 52, which from behind engages a central bore 56 of the cap 46 with detent projections 54, covers the hydraulic accumulator 10 on the open end of the blind bore 12. It closes the blind bore 12 in a manner which is not airtight.

For intermediate storage, pressurized brake fluid can flow into the hydraulic accumulator 10 according to the invention by means of the conduit 40. This brake fluid presses the piston 16 back counter to the force of the helical compression spring 42. Via the piston 16, the helical compression spring 42 displaces brake fluid which has flowed in as soon as the pressure abates. Pressure fluctuations which occur are damped by the damping diaphragm 22 by means of elastic deformation, that is, by means of compression, expansion, and curvature in both directions, or in other words it receives deforming work. Furthermore, it damps by virtue of the fact that it expands and contracts the annular damping chamber 24 on its back side as a result of its deformation. As a result, air contained in the damping chamber 24 is compressed or released and flows through the throttle bore 40. In this way, energy is likewise received, the brake fluid is withdrawn, and pressure fluctuations in the brake fluid are therefore damped.

Figure 2:
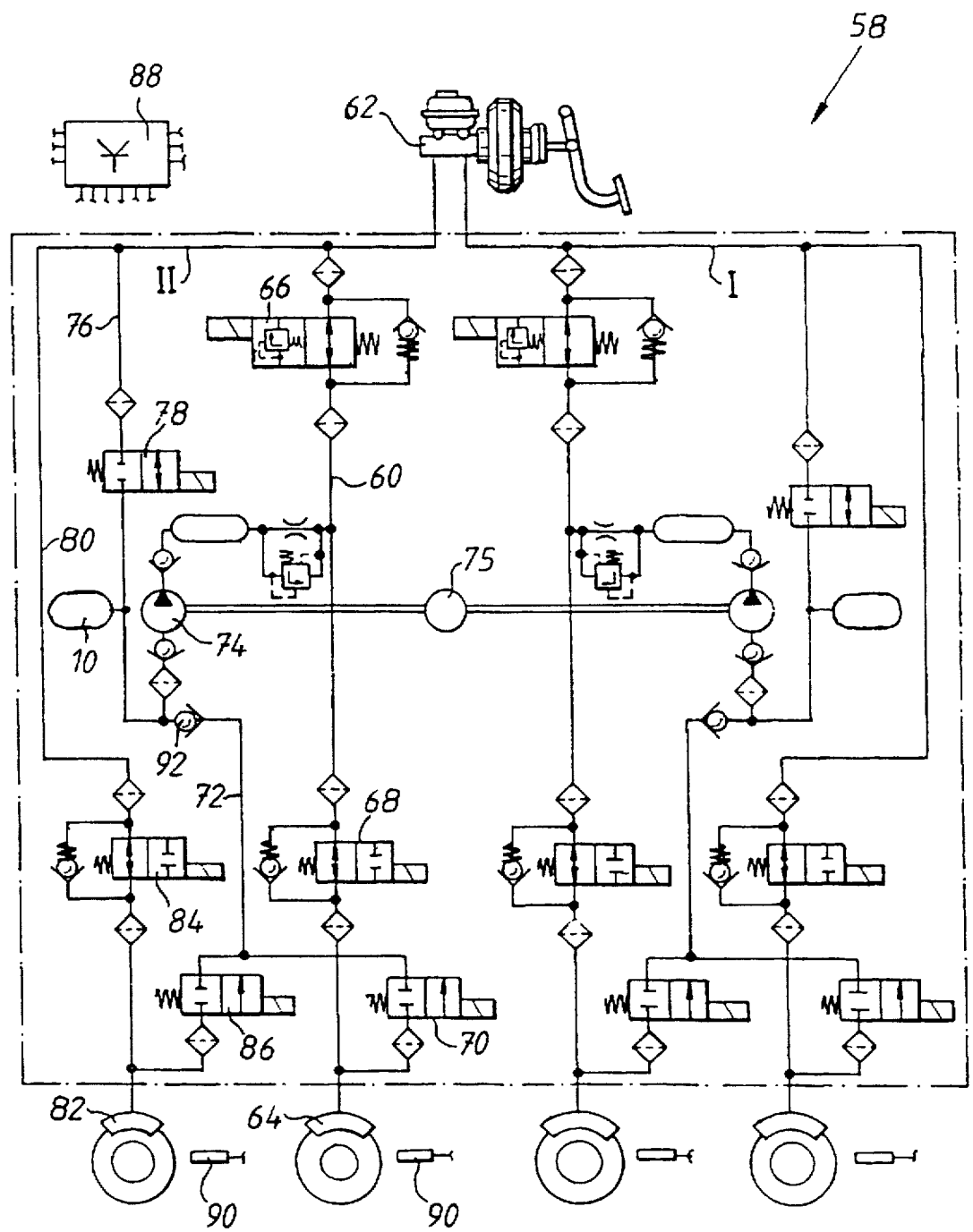
FIG. 2 shows a hydraulic block circuit diagram of a two-circuit brake system.

The brake system 56 shown in FIG. 2 has two brake circuits I, II which are independent of each other. The two brake circuits I, II are constructed similarly; they are explained in conjunction with the brake circuit II shown on the left in FIG. 2. A brake line 60 leads from a master cylinder 62 to a brake cylinder 64 of a driven vehicle wheel. A pressure limiting valve 66 and an inlet valve 68 for the brake cylinder 64 are inserted into the brake line 60; in their normal positions, both of them are normally open. An outlet valve 70 is connected to the brake cylinder 64; a return line 72 leads from this valve to the brake line 60 via a return pump 74 and discharges between the pressure limiting valve 66 and the inlet valve 68. The return pump 74 is driven by an electric motor 75, which is common to both brake circuits I, II. The outlet valve 70 is normally closed when in its normal position. Between the pressure limiting valve 66 and the master cylinder 62, a suction line 76 branches off from the brake line 60 and leads to a suction side of the return pump 74. An ASR (traction control system) stop valve 78 is inserted into the suction line 76; it is closed when in its normal position.

Another brake line 80 branches off from the brake line 60 between the master cylinder 62 and the pressure limiting valve 66. Another inlet valve 84 is inserted in the other brake line 80, which leads to a brake cylinder 82 of a non-driven vehicle wheel. An outlet valve 86 is connected to the brake cylinder 82, via which valve the brake cylinder 82 is connected to the return line 72 which leads to the suction side of the return pump 74.

To control all the valves, which are embodied as electromagnet valves, a control device 88 is provided which receives signals from wheel rotation sensors 90 and triggers the valves and the electric motor 75 of the return pump 74 in accordance with a predetermined control algorithm. Antilock braking operation is achieved in a manner known per se by means of the inlet and outlet valves 68, 70, 84, 86 which are associated with each wheel, whereupon the return pump 74 is set into motion. The traction control system is achieved only for the driven wheel by means of the inlet valve 68 and outlet valve 70 associated with this wheel and by means of the return pump 74, which in this instance ensures a brake fluid pressure increase. The pressure limiting valve 66 is closed.

To damp pressure fluctuations and to limit pressure peaks in the brake fluid, which occur because of the actuation of the valves of the brake system 58 as a result of the reaction of the pressure limiting valve 66 and as a result of pressure pulsations of the return pump 74, which is embodied as a one-piston pump, a hydraulic accumulator 10 according to the invention, with an integrated damper, is provided in each brake circuit I, II. The hydraulic accumulator 10 is connected to the suction side of the return pump 74. It follows a check valve 92, which is inserted into the return line 72 from the brake cylinders 64, 82 to the return pump 74.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A hydraulic accumulator for a hydraulic brake system with a traction control system for a motor vehicle, which comprises a piston having an open end and a closed end which piston is moved back and forth in a bore of a housing, a spring (42) that applies a spring force on said piston during movement within said bore of said housing, the piston (16) has a damping diaphragm (22) on said closed end which is supported against a front end face of the piston and oriented toward a brake fluid source, said damping diaphragm is elastic in at least one direction perpendicular to a plane of the diaphragm.

2. The hydraulic accumulator accordng to claim 1, in which the damping diaphragm (22) is elastic in both directions perpendicular to a plane of the diaphragm.

3. The hydraulic accumulator according to claim 1, in which a damping chamber (24) is enclosed between the damping diaphragm (22) and an end face of said bore oriented toward said damping diaphragm.

4. The hydraulic accumulator according to claim 2, in which a damping chamber (24) is enclosed between the damping diaphragm (22) and an end face of said bore oriented toward said damping diaphragm.

5. The hydraulic accumulator according to claim 1, in which the piston (16) has a throttle bore (40) in an end face oriented toward the damping diaphragm (22).

6. The hydraulic accumulator according to claim 2, in which the piston (16) has a throttle bore (40) in an end face oriented toward the damping diaphragm (22).

7. The hydraulic accumulator according to claim 3, in which the piston (16) has a throttle bore (40) in an end face oriented toward the damping diaphragm (22).

8. The hydraulic accumulator according to claim 2, in which the piston (16) has a fastening ring (30) which overlaps a circumference of the damping diaphragm (22) and fixes said damping diaphragm against the piston end face by crimping.

9. The hydraulic accumulator according to claim 3, in which the piston (16) has a fastening ring (30) which overlaps a circumference of the damping diaphragm (22) and fixes said damping diaphragm against the piston end face by crimping.

10. The hydraulic accumulator according to claim 4, in which the piston (16) has a fastening ring (30) which overlaps a circumference of the damping diaphragm (22) and fixes said damping diaphragm against the piston end face by crimping.

11. The hydraulic accumulator according to claim 5, in which the piston (16) has a fastening ring (30) which overlaps a circumference of the damping diaphragm (22) and fixes said damping diaphragm against the piston end face by crimping.

12. The hydraulic accumulator according to claim 6, in which the piston (16) has a fastening ring (30) which overlaps a circumference of the damping diaphragm (22) and fixes said damping diaphragm against the piston end face by crimping.

13. The hydraulic accumulator according to claim 7, in which the piston (16) has a fastening ring (30) which overlaps a circumference of the damping diaphragm (22) and fixes said damping diaphragm against the piston end face by crimping.

14. The hydraulic accumulator according to claim 8, in which the fastening ring (30) includes a flange (34), which secures a sealing ring (36) of the piston (16) against an annular shoulder (38) of the piston (16).

15. The hydraulic accumulator according to claim 9, in which the fastening ring (30) has a flange (34), which secures a sealing ring (36) of the piston (16) against an annular shoulder (38) of the piston (16).

16. The hydraulic accumulator according to claim 10, in which the fastening ring (30) has a flange (34), which secures a sealing ring (36) of the piston (16) against an annular shoulder (38) of the piston (16).

17. A hydraulic accumulator for a hydraulic brake system with a traction control system for a motor vehicle, which comprises a piston having an open end and a closed end which piston is moved back and forth in a bore of a housing, the piston (16) has a damping diaphragm (22) on a closed front end face of the piston oriented toward a brake fluid source, said damping diaphragm is elastic in at least one direction perpendicular to a plane of the diaphragm, and the piston (16) has a fastening ring (30) which overlaps a circumference of the damping diaphragm (22) and fixes said damping diaphragm against the closed front end face of the piston by crimping.

18. The hydraulic accumulator according to claim 12, in which the fastening ring (30) has a flange (34), which secures a sealing ring (36) of the piston (16) against an annular shoulder (38) of the piston (16).

* * * * *